(12) United States Patent
Norton

(10) Patent No.: US 9,191,456 B2
(45) Date of Patent: Nov. 17, 2015

(54) SYSTEMS AND METHODS FOR ESTABLISHING OR MAINTAINING A PERSONALIZED TRUSTED SOCIAL NETWORK

(75) Inventor: Kenneth Norton, San Carlos, CA (US)

(73) Assignee: YAHOO! INC., Sunnyvale, CA (US)

( * ) Notice: Subject to any disclaimer, the term of this patent is extended or adjusted under 35 U.S.C. 154(b) by 0 days.

(21) Appl. No.: 13/450,692

(22) Filed: Apr. 19, 2012

(65) Prior Publication Data

US 2012/0203852 A1  Aug. 9, 2012

Related U.S. Application Data

(63) Continuation of application No. 11/580,320, filed on Oct. 13, 2006, now Pat. No. 8,190,724.

(51) Int. Cl.
| | |
|---|---|
| G06Q 10/10 | (2012.01) |
| G06Q 30/02 | (2012.01) |
| G06F 17/30 | (2006.01) |
| H04L 29/08 | (2006.01) |
| G06Q 10/00 | (2012.01) |
| H04L 29/06 | (2006.01) |

(52) U.S. Cl.
CPC .............. *H04L 67/306* (2013.01); *G06Q 10/00* (2013.01); *G06F 17/30265* (2013.01); *G06F 17/30867* (2013.01); *G06Q 10/10* (2013.01); *G06Q 30/02* (2013.01); *H04L 63/104* (2013.01); *H04L 67/22* (2013.01)

(58) Field of Classification Search
None
See application file for complete search history.

(56) References Cited

U.S. PATENT DOCUMENTS

| 7,673,327 | B1 * | 3/2010 | Polis et al. ........................ 726/5 |
| 7,818,394 | B1 * | 10/2010 | Lawler et al. ................ 709/217 |
| 7,831,684 | B1 * | 11/2010 | Lawler et al. ................ 709/217 |
| 2004/0111508 | A1 * | 6/2004 | Dias et al. ..................... 709/224 |
| 2004/0203902 | A1 * | 10/2004 | Wilson et al. .............. 455/456.1 |
| 2005/0119990 | A1 * | 6/2005 | Lee et al. .......................... 707/1 |
| 2005/0235062 | A1 * | 10/2005 | Lunt et al. ..................... 709/225 |
| 2006/0031504 | A1 * | 2/2006 | Hegli et al. ................... 709/225 |
| 2006/0282851 | A1 * | 12/2006 | Errico et al. .................... 725/39 |
| 2006/0282856 | A1 * | 12/2006 | Errico et al. .................... 725/46 |
| 2007/0078851 | A1 * | 4/2007 | Grell et al. ........................ 707/7 |
| 2007/0100798 | A1 * | 5/2007 | Kapur ................................ 707/3 |
| 2007/0118525 | A1 * | 5/2007 | Svendsen .......................... 707/9 |

(Continued)

FOREIGN PATENT DOCUMENTS

EP          1288795 A1 *  3/2003  .............. G06F 17/30

*Primary Examiner* — Ario Etienne
*Assistant Examiner* — Ho Shiu
(74) *Attorney, Agent, or Firm* — Pillsbury Winthrop Shaw Pittman LLP

(57) ABSTRACT

Automated systems and methods are provided for establishing or maintaining a personalized trusted social network for a community of users, with little or no input from any given user. To establish the personalized trusted social network, one or more trusted sources are identified for a given user. The identified trusted sources are added to a user profile for the given user. Also, identified are any annotations, bookmarks, or the like that the identified trusted sources have associated with any shared content. These annotations provide access to microcontent items that the identified trusted sources have integrated with the shared content to thereby enhance or enrich its context. One or more profiles are constructed or updated to track the associations between the identified trusted sources and their annotations. The profile information can be applied to enhance and personalize search and browsing experiences for the given user.

15 Claims, 9 Drawing Sheets

(56) References Cited

U.S. PATENT DOCUMENTS

| | | |
|---|---|---|
| 2007/0150582 A1* | 6/2007 | Aaron et al. ............. 709/224 |
| 2007/0192844 A1* | 8/2007 | Chen et al. ............. 726/11 |
| 2007/0203887 A1* | 8/2007 | Dynin ............. 707/3 |
| 2007/0203906 A1* | 8/2007 | Cone et al. ............. 707/6 |
| 2007/0214503 A1* | 9/2007 | Shulman et al. ............. 726/22 |
| 2007/0226374 A1* | 9/2007 | Quarterman et al. ......... 709/250 |
| 2008/0005064 A1* | 1/2008 | Sarukkai ............. 707/3 |
| 2008/0091723 A1* | 4/2008 | Zuckerberg et al. ....... 707/104.1 |
| 2009/0070852 A1* | 3/2009 | Chijiiwa et al. ............. 726/1 |

* cited by examiner

Fig. 6

Yahoo!(R) Search [the long tail] [Search]

Search Results

Also try: long tail weasel, long tail cast on

1. The Long Tail - Wikipedia, the free encyclopedia
The Long Tail. From Wikipedia, the free encyclopedia ... The phrase The Long Tail (as a proper noun with capitalized letters) was first coined by Chris Anderson ... The term long tail is also generally used in statistics, often applied ...
en.wikipedia.org/wiki/Long_Tail - 32k - Cached - More from this site – Save 2. Wired 12.10: The Long Tail
... The Long Tail. Forget squeezing millions from a few megahits at the top of the charts ... Follow his continuing coverage of the subject on The Long Tail blog ...
*Saved by John Doe
www.wired.com/wired/archive/12.10/tail.html - 25k - Cached - More from this site – Save 3. The Long Tail
A public diary on the way to a book. Long Tail comment elsewhere... Might the Long Tail actually reduce choice? ... Might the Long Tail actually reduce choice? Nick Carr notes a NYT column that suggests that if all ... promoting the creation of a "long tail" of diverse products,

Fig. 7

Yahoo!(R) Search

Search Results

Also try: long tail weasel, long tail cast on

1. The Long Tail - Wikipedia, the free encyclopedia
The Long Tail. From Wikipedia, the free proper noun with capitalized letters) was also generally used in statistics, often ap en.wikipedia.org/wiki/Long_Tail - 32k - C 2. Wired 12.10: The Long Tail
The Long Tail. Forget squeezing milli
Follow his continuing coverage of the subject on The Long Tail blog ...
*Saved by John Doe
www.wired.com/wired/archive/12.10/tail.html - 25k - Cached - More from this site – Save 3. The Long Tail
A public diary on the way to a book. Long Tail comment elsewhere... Might the Long Tail actually reduce choice? ... Might the Long Tail actually reduce choice? Nick Carr notes a NYT column that suggests that if all ... promoting the creation of a "long tail" of diverse products, Issue 12.10 - October 2004
Subscribe to WIRED magazine and receive a FREE gift!

The Long Tail
Forget squeezing millions from a few megahits at the top of the charts. The future of entertainment is in the millions of niche markets at the shallow end of the bitstream.

By Chris Anderson                    Page 1 of 5 next »

*Chris is expanding this article into a book, due out in May 2006.*
*Follow his continuing coverage of the subject on The Long Tail blog.*

In 1988, a British mountain climber named Joe Simpson wrote a book called *Touching the Void*, a harrowing account of near death in the Peruvian Andes. It got good reviews but, only a modest success, it was soon forgotten. Then, a decade later, a strange thing happened. Jon Krakauer wrote *Into Thin Air*, another book about a mountain-climbing tragedy, which became a publishing sensation. Suddenly *Touching the*

Fig. 9

SYSTEMS AND METHODS FOR ESTABLISHING OR MAINTAINING A PERSONALIZED TRUSTED SOCIAL NETWORK

CLAIM OF PRIORITY

This application is a continuation of and claims priority to U.S. Ser. No. 11/580,320, filed on Oct. 13, 2006, entitled "Systems and Methods for Establishing or Maintaining A Personalized Trusted Social Network", which is incorporated herein by reference in its entirety.

CROSS REFERENCE TO RELATED APPLICATIONS

This application is related to the following patents and pending applications, each of which is hereby incorporated herein by reference in its entirety:

U.S. patent application Ser. No. 11/082,202, entitled "SEARCH SYSTEM AND METHODS WITH INTEGRATION OF USER ANNOTATIONS FROM A TRUST NETWORK," filed Mar. 15, 2005;

U.S. patent application Ser. No. 11/082,212, entitled "SEARCH SYSTEMS AND METHODS WITH INTEGRATION OF AGGREGATE USER ANNOTATIONS," filed Mar. 15, 2005;

U.S. patent application Ser. No. 11/081,860, entitled "SEARCH SYSTEMS AND METHODS WITH INTEGRATION OF USER ANNOTATIONS," filed Mar. 15, 2005;

U.S. patent application Ser. No. 11/081,871, entitled "SYSTEMS AND METHODS FOR COLLECTING USER ANNOTATIONS," filed Mar. 15, 2005; and U.S. Provisional Application No. 60/695,239, entitled "SEARCH ENGINE WITH AUGMENTED RELEVANCE RANKING BY COMMUNITY PARTICIPATION," filed Jun. 18, 2005.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention is directed to selecting and navigating shared content from a corpus of documents or other content. More specifically, the present invention is directed to systems and methods for developing a social network for discovering and recovering shared content.

BACKGROUND OF THE INVENTION

The MY WEB 2.0 web service, available from Yahoo! Inc., is an example of a web-scale social search engine that enables users to find, use, share and expand human knowledge. It allows users to save and tag Web objects, allowing for browsing and searching of objects, as well as sharing Web objects within a personalized community or to the public. Further, the MY WEB 2.0 Web service provides scoped searches within a user's trusted social network (e.g., friends and friends of friends). As a consequence, the search results are personalized and spam-filtered by trusted networks.

To experience the full benefits of personalized search results, a user typically must subscribe to the web service and create a profile that lists the names of the user's trusted social network. The user must include an email address or another personal identifier, so that each member of the social network can be accurately identified. Next, a database must be populated with Web objects, or links to Web objects, that the user and the user's network of friends have saved and tagged. This implies that the members of the user's social network must also be subscribers to the web service. After completing this process, the databases for the web service would be ready to enable the user to enjoy the benefits of personalized searches.

However, to complete the above process, the user must expend a considerable amount of time to collect the requisite data about the members of the user's social network. Considerable effort must also be expended to populate the databases with saved and tagged objects. As such, a user, including the members of the user's social network, can be initially discouraged from seeking the advantages of personalized web services.

Therefore, what is need is a system and method that overcome the above-noted shortcomings and provide an efficient and effective means for establishing a social network for sharing, discovery and recovery.

SUMMARY OF THE INVENTION

Automated systems and methods are described herein for establishing or maintaining a personalized trusted social network for a community of users, but with little or no input from any given user. An electronic social network (such as, the MY WEB 2.0 social searching services available from Yahoo! Inc.) enables a plurality of users to find, utilize, share, or annotate information throughout a distributed communications system, such as the global Internet. The users are allowed to save and/or tag content items; browse and/or search for objects; and share objects within the entire community or within a personalized subset of the entire community. To restrict a social network to a personalized subset of the entire community, the user must identify, or otherwise invite other users, to become a member of the personalized trusted social network.

To initially establish a personalized trusted social network for a given user, one or more community users are identified that have a hardware or software relationship with the given user. The identified users are thereafter added to a user profile for the given user as members of the personalized trusted social network for the given user. Additionally, or alternatively, the user profile for the given user can include other trusted sources (such as, electronic commerce businesses, news sources, professional associations, or the like) to build the personalized trusted social network.

Also, identified are any annotations, bookmarks, or the like that the identified trusted sources have associated with any shared content within a distributed communications system. These annotations, or the like, refer to microcontent items that the identified trusted sources have integrated with the shared content to thereby enhance or enrich its context. One or more profiles are constructed or updated to track the associations between the identified trusted sources and their microcontent.

For example, if a given user is a subscriber to an online service (such as, a blog), an RSS feed for the online service can be parsed to identify the owner (e.g., trusted source) of the online service as well as any other contributors or the like, including individuals or entities that have contributed to the online service by adding content items (e.g., comments) and/or attaching microcontent items (e.g., related articles). The identified individuals and/or entities (e.g., the owner and other contributors) are added as members to the user profile as trusted sources for the given user.

Alternatively, or in addition, a plurality of online services can be detected and parsed to identify the owner and other contributors without regard to whether a given user is an existing subscriber. For example, the online services can include the most popular blogs as determined by network traffic, or the online services can be determined by a human analyst by any means, as desired.

If the owner of an online service cannot be detected, the online service itself can be identified as the trusted source. Alternatively, the online service can be listed as a trusted source in addition to the owner. Moreover, in an embodiment, the owner of the online service is not researched or identified. Accordingly in such embodiment, the online service is identified as the trusted source.

In addition to detecting the trusted sources for an online service, the online service is analyzed to determine if a trusted source has included any annotations, bookmarks, hyperlinks, attachments, or the like that provide access to microcontent. Microcontent includes supporting content that a trusted source links or associates with a content item (e.g., blogged comment) provided in the online service. For example, a trusted source can have included hyperlinks from blogrolls, URLs a blogger has blogged, or the like. If annotations are discovered, this metadata is also collected to track its association with the corresponding trusted source. As such, a critical mass of site metadata can be created to identify and store any site that a blogger, for example, has publicly marked.

As a result, a user profile for a given user can be constructed or updated to include a listing of trusted sources that represent members of the personalized trusted social network for the given user. The user profile is integrated with another profile that tracks the associations between the trusted sources and any annotations (also, as extracted from the online services) that the trusted sources have associated with content items. The profile information can be applied in various ways to enhance and personalize search and browsing experiences for the given user. For example, when a user searches a corpus of content, any hits corresponding to a microcontent item that has been annotated by a trusted source from the user's profile can be highlighted with a link allowing the user to access, e.g., the blog that enabled the trusted source to be associated with the user, as well as to the actual blog entry by the trusted source. Therefore, the user can view the blog entry and consider the context in which the trusted source is using the microcontent item.

BRIEF DESCRIPTION OF THE DRAWINGS

The invention is illustrated in the figures of the accompanying drawings, which are meant to be exemplary and not limiting, in which like references are intended to refer to like or corresponding parts, and in which:

FIG. 6 illustrates a partial frame of microcontent retrievable from activating a microcontent link according to an embodiment of the present invention;

FIG. 7 illustrates annotated search results according to an embodiment of the present invention;

FIG. 9 illustrates navigation to microcontent listed in annotated search results from a page of annotated search results according to an embodiment of the present invention.

DETAILED DESCRIPTION OF THE INVENTION

Figure 1:
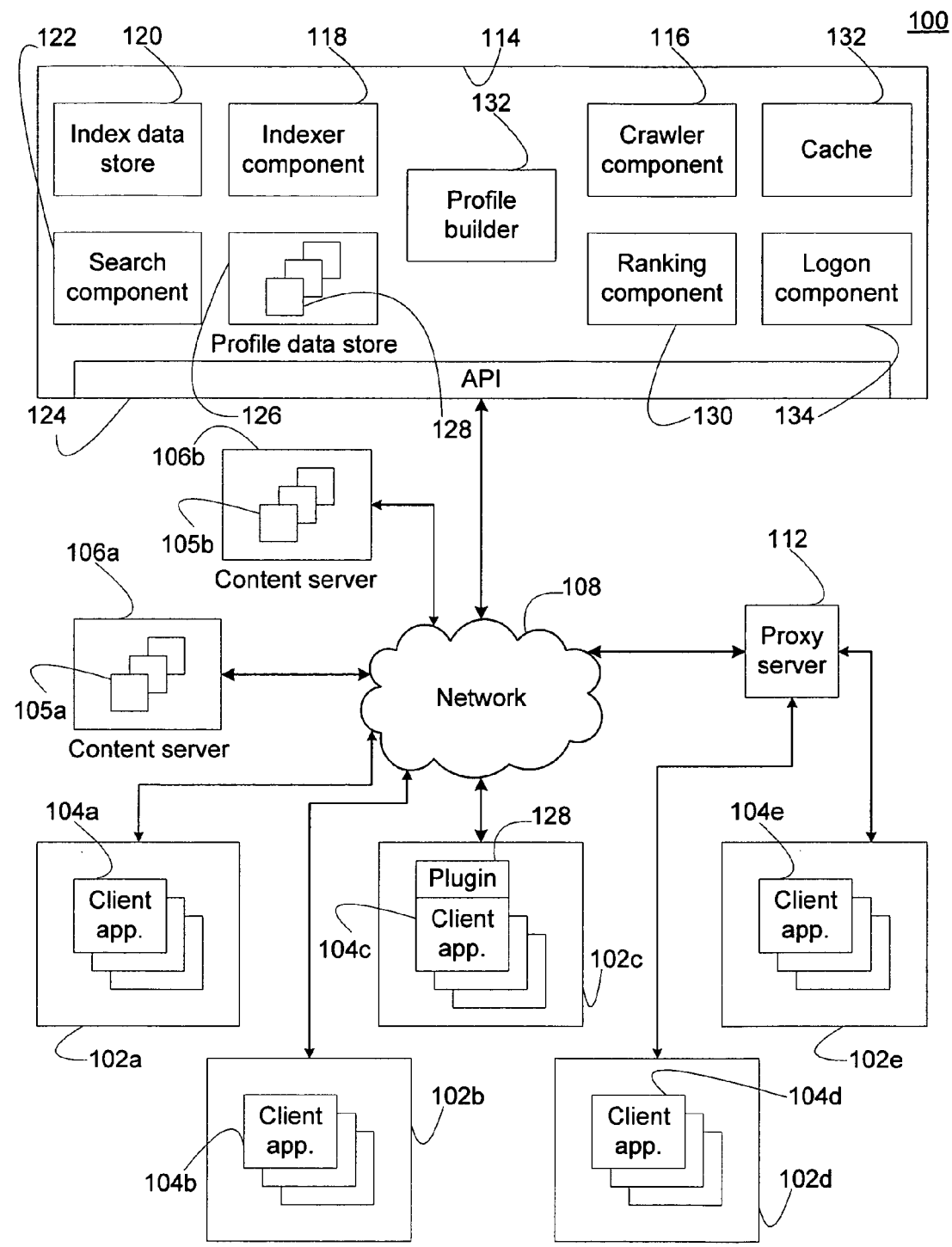
FIG. 1 illustrates a social network development and management system according to an embodiment of the present invention.

Automated systems and methods are described herein for establishing a personalized trusted social network for a community of users, but with little or no input from any given user. A social network can be represented as a graph of interrelated nodes, wherein each node in the graph represents a user and each edge represents a relationship with another user, such as a friend, colleague, family member, or the like (referred to herein as buddies) and/or with other entities, such as businesses, nonprofit organizations, government agencies, activist groups, educational institutions, news sources, file-sharing communities, professional associations, or the like. The degree of separation between a pair of nodes is the minimum number of hops from one node to another. For example, a degree zero node is a given node itself, degree one nodes are those nodes that are directly connected to the given node, degree two nodes are those nodes that have one node between themselves and the given node, degree three nodes are those nodes that have two nodes between themselves and the given node, and so forth.

It should be understood that the above listing of "buddies" and other "entities" are provided by way of example and are not intended to be exclusive. As used herein, the expressions buddies and entities are collectively referred to herein as trusted sources, as these sources are considered to part of the trusted social network of a given user.

An electronic social network (such as, the MY WEB 2.0 social searching services available from Yahoo! Inc.) enables a plurality of users to find, utilize, share, or annotate information throughout a distributed communications system, such as the global Internet. The users are allowed to save or tag items of content; browse and/or search for the content items; and share the content items within the entire community or within a personalized subset of the entire community. To restrict a social network for a specific user to a personalized subset of the entire community, the user must identify, or otherwise invite, other users so that they can become a member (e.g., buddies) of the personalized social network. Similarly, the user must specify an association with a particular entity (e.g., university alumni association, professional organization, online news service, or the like).

A user within an electronic social network can annotate the content items found within a corpus of media and/or multimedia (e.g., the World Wide Web). As used herein, the term "content" comprises the information contained within an object, such as a Web object, Web page, Web site, document, interactive data structures, or the like. A collection of such information is referred herein as an "item of content" or a "content item." The term "annotation," as used herein, refers to any descriptive and/or evaluative metadata related to a content item that is collected from a user and thereafter stored in association with the user or the content item. Annotations can include various fields of metadata, such as a rating (which can be favorable or unfavorable) of a document, a list of keywords identifying a topic (or topics) of a document, a free-text description of a document, and/or other fields. An annotation can be collected from a user of the corpus and stored in association with an identifier of the user who created the annotation and an identifier of the document (or a content item included within the document or other object type) to which it relates.

Annotations have many applications. For instance, one or more users viewing a page of search results are able to annotate one or more of the content items (e.g., the listed items within the search results) and save the annotations. One or more users can also create and save an annotation for any object (e.g., page or site visited). Stored annotations can be used in various ways to enhance and personalize search and browsing operations. For example, when a user searches the corpus, any listed item from the search results (herein referred to as "hits") corresponding to pages that the user has annotated (referred to herein as "annotated hits" or "annotated search results") can be highlighted, with a link being provided to allow the user to view the annotation. If the annotation includes judgment data such as a numerical rating, the annotated hit can be highlighted to indicate whether the judgment was favorable or unfavorable. The ratings can also be used for ranking search results in response to user queries, with favorable judgments tending to increase the ranking of a given page or site and unfavorable judgments tending to decrease the ranking. If the annotation includes user-supplied free text and/or descriptive keywords or labels, the user can have the option to search the annotations in addition to or instead of page content. Any time the user visits a page that has been annotated, a control can be provided to allow the user to view and/or edit the annotation.

FIG. 1 illustrates a social network development and management system 100 in accordance with an embodiment of the present invention. System 100 includes a plurality of client devices 102a-102e, at least one content server 106a-106b, at least one search provider 114, and a communications network 108. One or more proxy servers 112 can also be provided. However, this component is optional. It should be understood that system 100, as described herein, is an exemplary system that is useful for implementing various aspects of the present invention. Various modifications and variations can be made without departing from the scope of the present invention. For example, the quantity of system components illustrated in FIG. 1 can be increased or decreased as desired by the system architect. Moreover, the present invention can be implemented in other communication systems that allow a user to search and annotate content, or annotate any type of content, that is made available for sharing, discovery, and/or recovery by the same user or a community of users having access to the content.

Referring to FIG. 1, a user interacts with a client device 102a-102e. One or more of the client devices 102a-102e can be a personal computer that includes a processor, transient memory (e.g., RAM), persistent memory (e.g., hard drive), an input device (e.g., mouse, keyboard, touch screen, stylus, voice command interface, or the like), and circuitry to provide communication paths between the components. One or more of the client devices 102a-102e can also be a desktop computer, notebook computer, computer workstation, personal digital assistant (PDA), cellular device, thin client, or the like.

Each client device 102a-102e comprises network interface hardware and software that provides the client device 102a-102e with the ability to transmit and receive data over a network 108. The network 108 provides communication channels between the client devices 102a-102e, content servers 106a-06b, search provider 114, and other information sources. Network 108 can be a wired and/or wireless local area network (LAN), virtual LAN (VLAN), wide area network (WAN), and/or metropolitan area network (MAN), such as an organization's intranet, a local internet, the global-based Internet (including the World Wide Web (WWW)), an extranet, a virtual private network (VPN), licensed wireless telecommunications spectrum for digital cell (including CDMA, TDMA, GSM, EDGE, GPRS, CDMA2000, WCDMA FDD and/or TDD or TD-SCDMA technologies), or the like. Network 108 can support wired, wireless, or combinations of both transmission media, including satellite, terrestrial (e.g., fiber optic, copper, UTP, STP, coaxial, hybrid fiber-coaxial (HFC), or the like), radio, free-space optics, microwave, and/or any other form or method of transmission.

A memory device on each client device 102a-102e, which can be a persistent or transient storage device, provides storage for one or more client applications 104a-104e. The client devices 102a-102e can run an operating system that provides both a high-level user interface as well as a low-level input/output control and memory management for the client devices 102a-102e. Exemplary operating systems include the MICROSOFT WINDOWS XP(™) operating system deployed on some personal computers, and the SYMBIAN OS™ operating system deployed on some portable cellular devices. Regardless of the operating system, the client devices 102a-102e maintain an application program 104a-104e that provides an interface for browsing content made available by one or more content servers 106a-106b. Other examples of application programs 104a-104e that can be executed on a client device 102a-102e include, but are not limited to, email applications, instant messaging applications, document management applications, or the like.

The one or more content servers 106a-106b host files 105a-105b, which are accessible to clients 102a-102e over the network 108. A file 105a-105b contains one or more items of content formatted as, e.g., text, graphics, audio, video, etc. As used herein, the term "file" refers to an object that includes one or more items of content and that can be retrieved from a unique location or address (e.g., a uniform resource locator (URL)). A client 102a-102e uses a client application 104a-104e, such as a web browser, to issue a request for a file 105a-105b to a content server 106a-106b by providing an address for the file 105a-105b. The client application 104a-104e receives the file 105a-105b that is responsive to the request. The client application 104a-104e renders the content that is contained in the file. For example, where a browser (e.g., client application 104a) running on a client device (e.g., client device 102a) requests a web page (e.g., file 105a) from a web server (e.g., content server 106a), the browser receives the requested page and renders the content comprising the page, which can include links to download and render additional files from other web sites. Such additional files that are linked to the web page are referred to herein as "microcontent."

The search provider 114 provides a mechanism that allows client devices 102a-102e to search for files 105a-105b of interest. The search provider 114 comprises an crawler component 116, an indexer component 118, an index data store 120, a search component 122, a ranking component 130, a cache 132, a profile data store 126 to provide persistent storage for one or more user profiles 128, a logon component 134, a profile builder 136, and an application program interface ("API") 124 that the other search provider components 116, 118, 122, 130, 132, 134, and 136 can use to execute functions for storage, retrieval and manipulation of data in the index data store 120 and profile data store 126. API 124 enables system architects to collect information to assist in the indexing of files, as well as provide techniques for using the information for searching and ranking of result sets that are responsive to user queries. It should be noted that the search provider 114 and its constituent components can be deployed across the network 108 in a distributed manner whereby key components are duplicated and strategically placed throughout the network 108 for increased performance, e.g., close to the edges of the network.

The search provider 114 comprises a crawler component 116 that is operative to open a communications channel with a content server 106a-106b over the network 108. The crawler 116 retrieves a file 105a-105b from the content server 106a-106b and can store a copy of the file 105a-105b in a cache 132 at the search provider 114. The cache 132 is a persistent storage device. The crawler component 116 can also follow links to other files (e.g., microcontent) in the file 105a-105b, navigating to the linked files (e.g., microcontent) and saving a copy of the linked files in the cache 132, and so forth. Preferably, the crawler component 116 retrieves files from a plurality of content servers 106a and 106b in a substantially simultaneous manner so as to collect files 105a and 105b from the greatest number of content servers 106a and 106b in the least amount of time.

In addition to using the crawler component 116 to collect files 105a-105b from over the network 108, the search provider 114 can also collect information on individual users by monitoring user interaction with client applications 104a-104e, content servers 106a-106b, the search provider 114, and other information sources made available over the network 108. The search provider 114 can collect information according to a number of techniques. According to a first technique, a client application 104c interfaces with a plug-in component 128, e.g., a browser toolbar component that monitors information in the stream of data traffic transmitted and received by the client application 104c. The plug-in 128 can aggregate this information locally on a transient or persistent storage device, which the plug-in 128 periodically transmits to the search provider 114 over the network 108. An example of such a plug-in is the YAHOO! Toolbar browser plug-in for the MICROSOFT INTERNET EXPLORER™ browser.

Alternatively, or in conjunction with a plug-in 128, a client application 104d-104e can be in communication with a proxy server 112. Data traffic from the client 102d-102e passes through the proxy server 112 prior to receipt by the component to which the data is addressed, e.g., content server 106a-106b. The proxy server 112 can record information from the stream of data traffic transmitted and received by the client application 104d-104e. The proxy server 112 can further aggregate this information from a plurality of connected clients 102d-102e and periodically transmit the information to the search provider 114. If the client application 104a-104b employs neither a plug-in 128 nor transmits and receives information through a proxy server 112, the search provider 114 can directly collect information from the stream of data that the client application transmits and receives. For example, if the search provider maintains a suitably large collection of files in its cache 132, the user can browse though files from the cache as opposed to browsing the file from its source location, allowing the search provider 114 to observe information in the data stream.

In addition to collecting information from the stream of data that the client application 104a-104e transmits and receives, the search provider 114 can provide advanced functionality that allows a user to perform functions on files 105a-105b that the user browses. The search provider 114 comprises an API 124 that exposes functions for allowing the user to personalize files and the content contained within files, as well as maintain a user's navigation history, which is referred to herein as "personalization." Personalization functions that the API 124 provides include, but are not limited to, saving copies of files, tagging files, annotating files, and performing other functions, e.g., highlighting content in a file.

The search provider 114 also comprises a login component 134 that provides authentication of user credentials, thereby providing access to the personalized information. Credentials that the user provides to the login component 134 can comprise a username/password pair, a physical token, a biometric identifier, or other identification credentials. According to an embodiment, the browser plug-in 128 provides client-side communication to the API 124. When the user wishes to log into the search provider 114, the plug-in 128 provides the login interface and makes the appropriate calls to the API 124 to authenticate the user.

When the search provider 114 authenticates the user credentials, the search provider 114 provides the user with access to the functions that the API 124 offers. As the user uses the client application 104a-104e to browse files 105a-105b that the content servers 106a-106b host, function calls can be made to the API 124 to generate personalized information. According to an embodiment, the API 124 provides a function call that allows a user to save an annotation and associate the annotation with a file at a given address, each annotation, for example, providing the user's thoughts or comments regarding the file or the content contained therein. Similarly, the API 124 can provide a function call that allows a user to save one or more tags and associate the tags with a file at a given address, each tag, for example, providing a descriptive keyword for describing the file or the content contained therein. Another function that the API 124 provides allows a user to save a personal copy of the file or select pieces of content contained therein. Systems and methods for generating personalized information are described in commonly owned patent application Ser. No. 11/081,860, entitled "SEARCH SYSTEMS AND METHODS WITH INTEGRATION OF USER ANNOTATIONS," filed Mar. 15, 2005, and commonly owned patent application Ser. No. 11/082,202, entitled "SEARCH SYSTEM AND METHODS WITH INTEGRATION OF USER ANNOTATIONS FROM A TRUST NETWORK," filed Mar. 15, 2005, the disclosure of which are hereby incorporated by reference in their entirety.

The search provider 114 includes a profile builder 136 that creates a profile 128 for each user of a client application 104a-104e with which the search provider 114 is in communication, e.g., through a plug-in 128 or proxy server 112, for the storage of personalized information. The profile builder 136 generates user profiles 128 that organize and provide the user with access to his or her personalized information, as well as allow the search provider 114 to leverage the personalized information in indexing, searching and ranking search results to enhance relevance.

A number of mechanisms can be implemented to collect personalized information regarding a user including, but not limited to, navigation history, saved documents, tags, annotations, and other information. The profile builder 136 stores this information on a per-user basis as one or more profiles 128 in a profile data store 126. According to an embodiment, the profile data store 126 is a relational database whereby each user profile 128 is structured as records located in one or more related data tables. Other data stores are also contemplated as falling within the scope of the present invention including, but not limited to, comma separated value data stores, tab delimited value data stores, object-oriented databases, hybrid relational-object databases, or the like. The user profiles 128 provide the search provider 114 with a mechanism to retrieve the user's personalized information, such as annotations, tags, saved pages, navigation history, or the like. For example, when the user navigates to a page on which the user has previously recorded an annotation, the search provider 114 displays the user annotation on a display device in conjunction with the page to which the user navigated.

In addition to the foregoing personalized information captured for storage in the user profile 128, the profile builder 136 allows the users to become members of an electronic social network of interrelated users and other entities, and make available the user personalized information to other members of the trusted social network. Moreover, a user profile 128 for a given user can be configured to restrict access to the personalized information of the given user to specific members (e.g., buddies or other entities) of a personalized trusted social network, as discussed above. By operating a respective client device 102a-102e, a user can identify, or otherwise send invitations to, other users so that they can become a member. An identification message from the user, or an acceptance message from the invited users, can be transmitted to the profile builder 136 for further processing. When a user becomes a member of, e.g., an activist organization, or subscribes to, e.g., an online news service, identification information can be transmitted to the profile builder 136.

Figure 2:
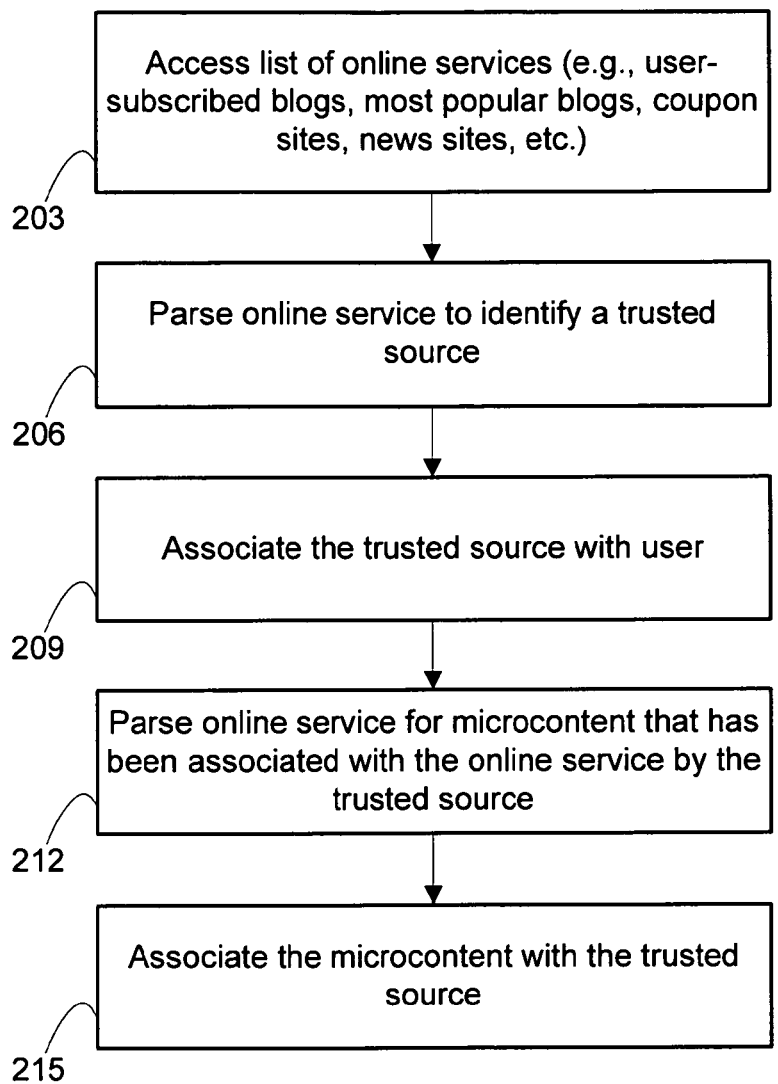
FIG. 2 illustrates an operational flow for constructing a listing of trusted sources for a given user according to an embodiment of the present invention.

Profile builder 136 is also operative to automatically associate one or more trusted sources (e.g., individuals or other entities) to a given user, and thereby construct a listing of trusted sources for a personalized trusted social network. Referring to FIG. 2, an example of a general operational flow is described for building a personalized trusted social network. More specifically, flowchart 200 illustrates an exemplary control flow for automatically identifying trusted sources for a given user (referred to herein as "the given user") within an electronic social network.

To initially establish a personalized trusted social network for the given user, one or more trusted sources are identified that have a pre-defined relationship or association with the user. To that end, one or more online services are detected that enable electronic communications to its customers, members, affiliates, or subscribers over network 108, step 203. The online services can include blogs, electronic bulletin boards, emails distributed via a mailing list server, members-only web sites, news sites, alert services, coupon sites, or the like.

In an embodiment, the online services include only those services that the user has an active or expired membership, subscription, or the like. In other embodiments, the online services are identified without regard to whether the given user is an existing or past member, subscriber, customer, or the like. For example, the online services can include the most popular blogs as determined by network traffic, or the online services can be determined by a human analyst by any other means as desired.

After determining or accessing a listing of online services, each online service is parsed to identify a trusted source, step 206. The trusted source can be the owner, editor, or any type of administrative overseer of the online service. For example, the trusted source can be the owner of a blog (herein referred to as "blogger"). Depending on the format and type of online service, the trusted source can be some other participant that contributes to the content of the online service. For example, if a blog or electronic bulletin board permits comments and other content items from other subscribers to be appended to its scroll, those subscribers can also be identified as a trusted source.

If the owner of the online service cannot be detected, the online service itself can be identified as the trusted source. Alternatively, the online service can be listed as a trusted source in addition to the owner. Moreover, in an embodiment, the owner of the online service is not researched or identified. Accordingly in such embodiment, the online service is identified as the trusted source.

Upon identification of a trusted source (including the owner, other participants, or the like, if appropriate), each trusted source is associated with the given user, step 209. In an embodiment, a user profile 128 for the given user is updated to associate the identified trusted sources with the user. If an identified trusted source is a current user of system 100 (e.g., a current user profile 128 exists for the trusted source), the user profile 128 for the trusted source can also be updated to cross-relate the trusted source with the given user. If an identified trusted source is not a current user of system 100, one or more for following actions can be executed: the identified trusted source can be solicited to become a user or member of system 100, a new user profile 128 can be built and stored for the trusted source, the identified trusted source can be ignored, or some combination of the above.

The identified trusted sources, therefore, are added to the user profile 128 for the given user to create a personalized trusted social network. If the user is a new user of system 100, the above process generates an initial listing of trusted sources for the new user. If the user is an existing user of system 100, the listing of trusted sources is modified to include the new associations.

In addition to identifying trusted sources, each online service is parsed to identify any microcontent that has been associated with the online service by the trusted source, step 212. As discussed above, microcontent includes any content item that is linked, bookmarked, or otherwise associated with a specific content item. For example, a blogged content item can include links to supporting documentation, articles, forms, multimedia, images, or the like (e.g., files 105a-105b). These links are gathered and associated with the trusted source, step 215. The associations of microcontent can be stored in a distinct user profile 128 for the trusted source, in the same user profile 128 as the given user, or in a collective user profile 128 for all microcontent associations with a trusted source.

Figure 3:
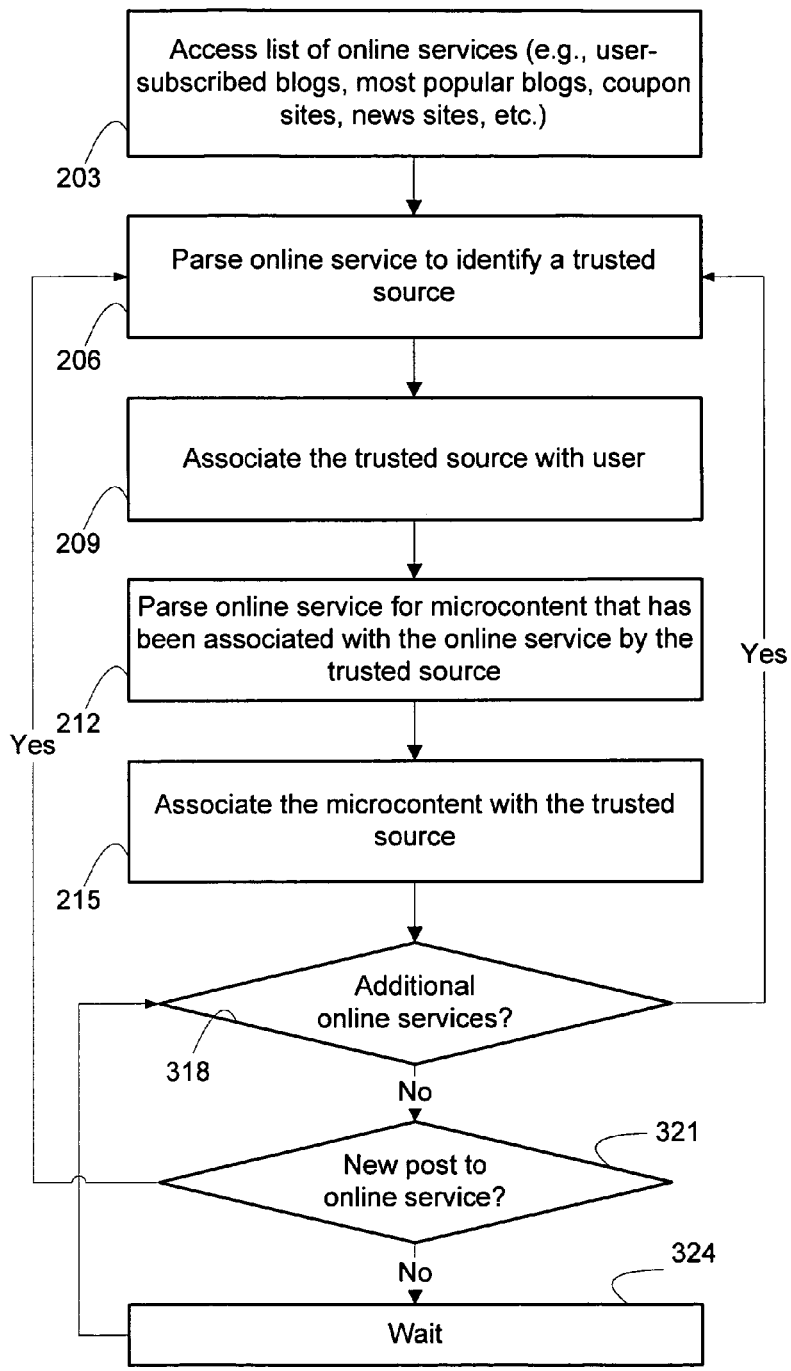
FIG. 3 illustrates an operational flow for monitoring user associations to update a listing of trusted sources for a given user according to an embodiment of the present invention.

Alternatively, or in addition, to establishing a listing of trusted sources for a personalized trusted social network, profile builder 136 is operable to continuously or periodically monitor the online services, associations amongst the given user and trusted sources to the online services, and/or associations amongst trusted sources and microcontent, to thereby update the user profiles 128 and the listing of trusted sources. Referring to FIG. 3, flowchart 300 illustrates an example of a control flow for automatically monitoring user associations to update a listing of trusted sources for a given user.

After identifying and storing the associations amongst the given user and trusted sources to online services, and the associations amongst trusted sources and microcontent, steps 203-215, it is determined whether the given user has subscribed to any additional online services and/or whether any additional online services have become available over network 108, step 318. If an additional online service is detected, the online service is parsed for trusted sources, step 206, and the control flow repeats, steps 206-318.

The online services are also analyzed to determine if new posts or contributions have been added, step 321. This process can be implemented in addition to, or in lieu of, the process for checking for additional online services, discussed at step 318. If new posts are detected, the updated online service is parsed to determine if the new post is from a new trusted source (e.g., user adding a comment to an electronic bulletin board or blog, reporter publishing an updated news story, or the like), step 206, and the control flow repeats, steps 206-321.

If it is determined that no additional online services have been detected and no updates have been made to the online services, the control flow resides in dormant state, step 324. The waiting period for the dormant state can be any period of time as desired by the system architect. Hence, user associations can be monitored for additional online services and/or for updates to the online services on a fixed or periodically scheduled basis.

Upon establishing and/or updating the personalized trusted social network, the given user can review or modify the user profile 128 to add or delete a member of the listing of trusted sources, as desired. In an embodiment, the user can include the user's own annotations to the members or to other entities or objects. Examples of systems and methods for generating personalized information are described in commonly owned patent application Ser. No. 11/081,860, entitled "SEARCH SYSTEMS AND METHODS WITH INTEGRATION OF USER ANNOTATIONS," filed Mar. 15, 2005, and commonly owned patent application Ser. No. 11/082,202, entitled "SEARCH SYSTEM AND METHODS WITH INTEGRATION OF USER ANNOTATIONS FROM A TRUST NETWORK," filed Mar. 15, 2005, the disclosures of which are hereby incorporated by reference in their entireties.

Figure 4:
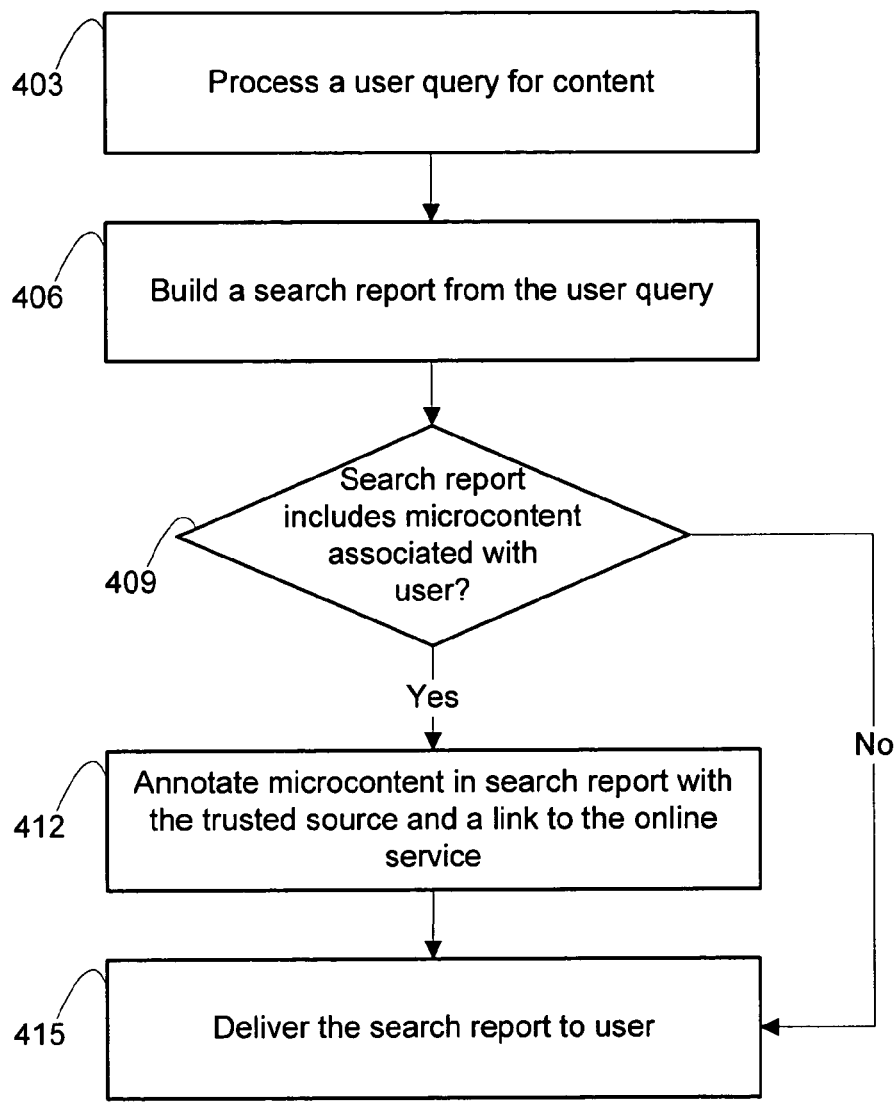
FIG. 4 illustrates an operational flow for receiving search results annotated with content from a listing of trusted sources according to an embodiment of the present invention.

The user and microcontent associations, as described above, from the user profiles 128 can also be applied in various ways to enhance and personalize the search and browsing experiences for the given user. Referring to FIG. 4, flowchart 400 illustrates an exemplary control flow for receiving search results annotated with content from an automatically constructed listing of trusted sources.

When a user submits a search query for specified content, step 403, a search report is produced that includes a list of content corresponding to the specifications of the user query, step 406. Each item in the search report is analyzed to determine if the item has been associated with any member of the user's trusted social network, step 409. As discussed above, search provider 114 stores associations amongst a given user and trusted sources of online services, and associations amongst trusted sources and microcontent. If a microcontent item is included among the items in the search report, the microcontent item is annotated with the trusted source associated with microcontent, and a link to the online service that includes the content contributed by the trusted source, step 412. The annotated search report is thereafter delivered to the user that submitted the query, step 415.

Figure 5:
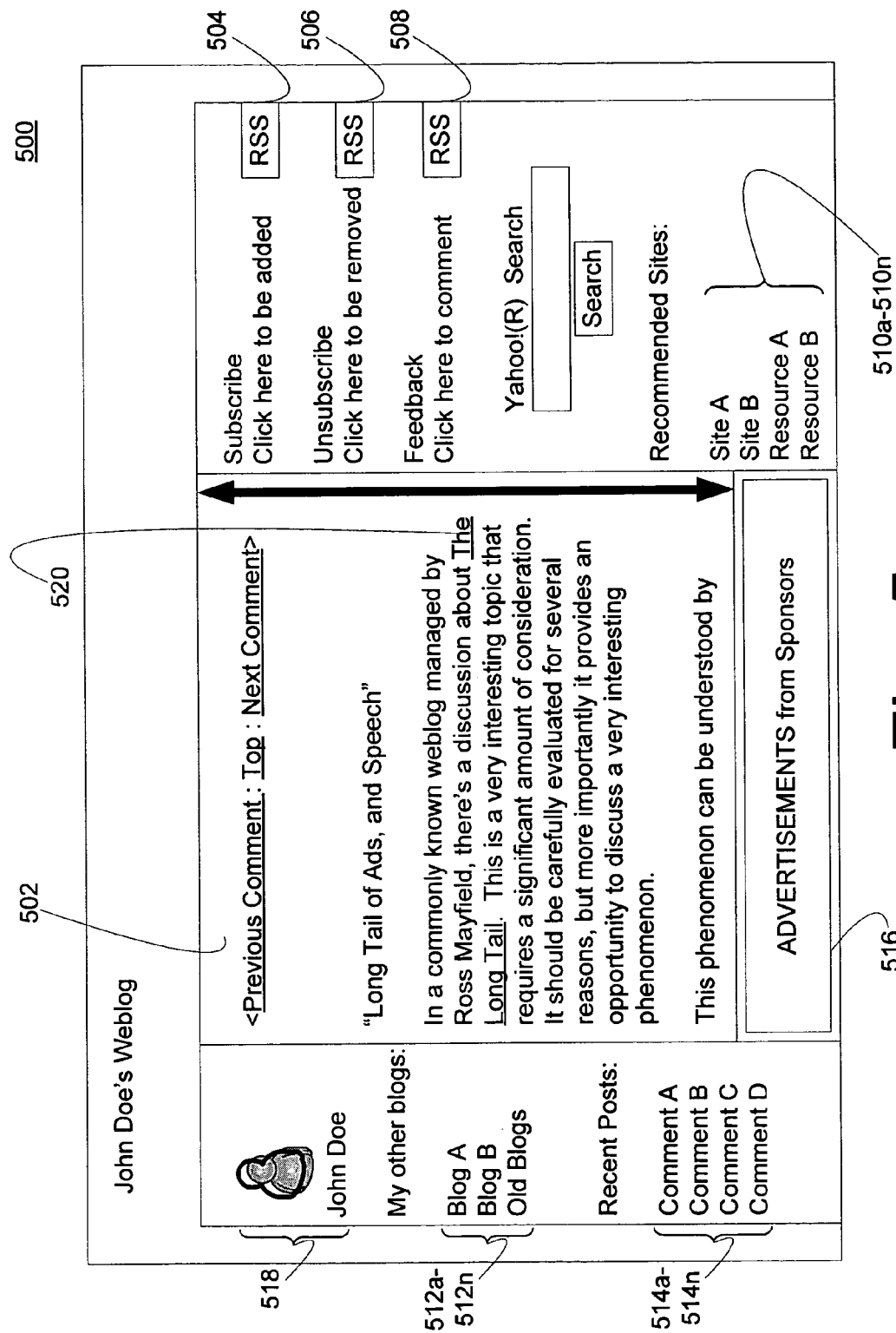
FIG. 5 illustrates a graphical user interface for presenting content from a blog to a user according to an embodiment of the present invention.
Figure 6:
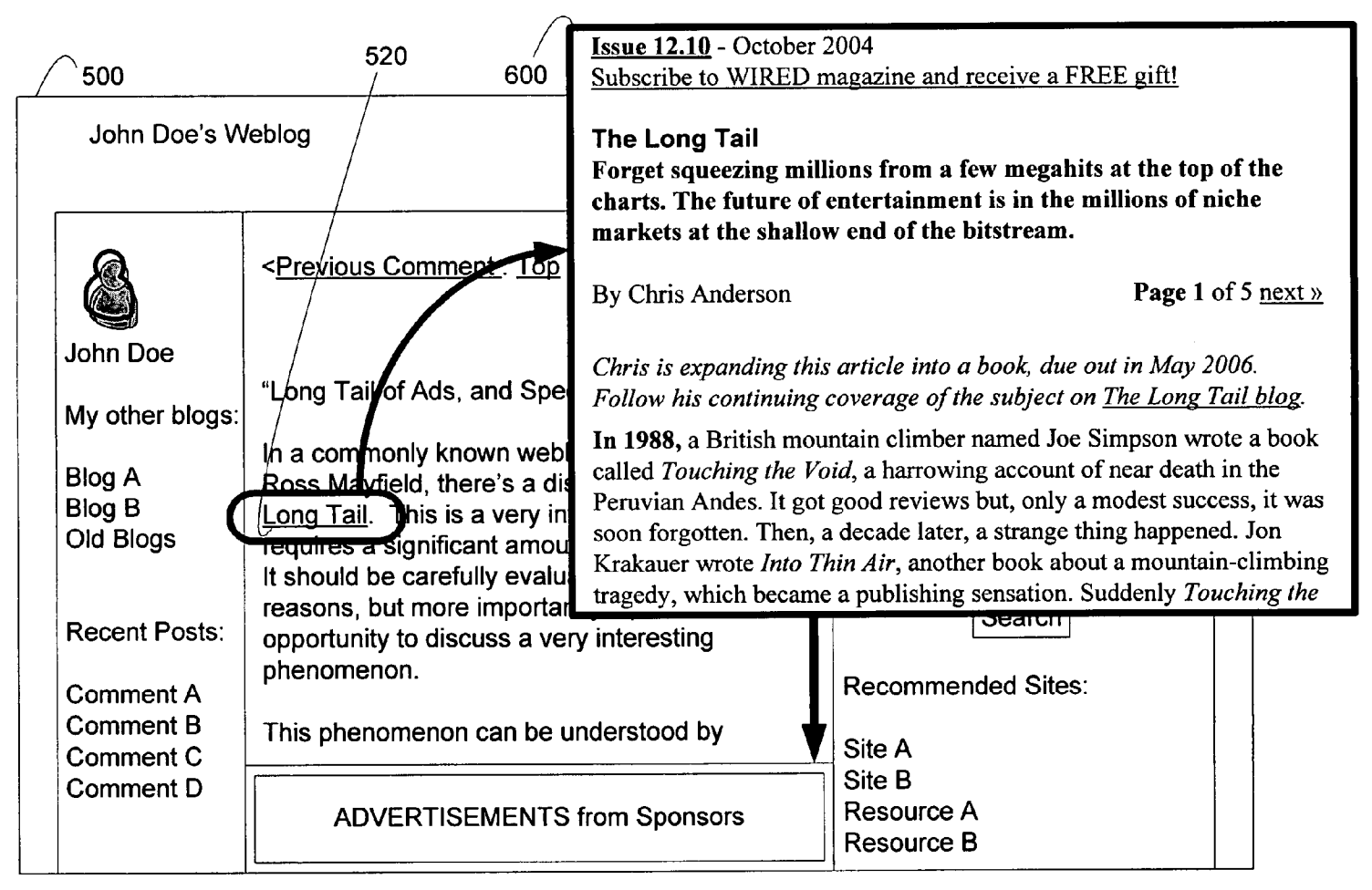

This process can be explained with reference to FIG. 5, which illustrates a graphical user interface (GUI) for presenting content from a blog 500 to a user. A discussion thread containing specific content items is included in discussion panel 502. The owner 518 of the blog 500 is identified as John Doe. As discussed above, owner John Doe, the blog 500 itself, or both John Doe and the blog 500 can be designated as a trusted source. In this example, John Doe maintains the blog 500 by contributing content items in discussion panel 502. To enrich the context of the content items, the blog owner 518 includes a microcontent link 520 to another web site or location that includes supporting documentation (e.g., microcontent). FIG. 6 illustrates an example of a partial page 600 of microcontent that can be retrieved by activating microcontent link 520.

Comments links 514a-514n allows the blog owner 518 to provide access to previous postings from discussion panel 502. Blog links 512a-512n allows access to other blogs owned or managed by the blow owner 518. Auxiliary information links 510a-510n provides access to other web sites or blogs that are recommended by the blog owner 518. An advertisement region 516 allows the presentation of various types of advertisements, announcements, or promotions.

Blog 500 also includes a subscription activator 504, subscription deactivator 506, and a feedback activator 508. Subscription activator 504 enables a user to subscribe to the blog 500, and subscription deactivator 506 enables a user to terminate the subscription. Feedback activator 508 allows users to submit questions, comments, or the like to the blog owner 518.

To build a personalized trusted social network for a given user, an RSS feed for the blog 500 can be parsed to identify the blog owner 518 as being a trusted source, see step 206. As discussed above, if the blog owner 518 allows other users to post comments or other types of contributions to the blog 500, those users can also be identified as a trusted source. Moreover, in some embodiments, the blog 500 is identified as a trusted source in lieu of or in addition to the blog owner 518. All trusted sources are associated with the given user, step 209.

In addition to detecting a trusted source, a portion or all of blog 500 is analyzed to determine if the trusted source has included any annotations, bookmarks, hyperlinks, attachments, or the like. For example, the trusted source can have included hyperlinks from blogrolls, URLs a blogger has blogged, or the like. Thus, the RSS feed is parsed for microcontent that has been blogged by the blog owner 518, and if appropriate, other contributing trusted sources. In an embodiment, all of the RSS feed is parsed; in other embodiments, only a portion (such as the most recent portion) of the RSS feed is parsed for microcontent. In an embodiment, the RSS feed is followed to an originating page to mine information.

The microcontent is identified by the microcontent link 520. In addition to microcontent link 520, other links can also be identified as a source for microcontent, such as auxiliary information links 510a-510n, blog links 512a-512n, or advertisement region 516. The microcontent links are associated with the trusted source (e.g., blog owner 518), step 215. As such, a critical mass of site metadata can be created to identify and store any site that a blogger, for example, has publicly marked.

FIG. 7 illustrates a partial page of annotated search results 700 in accordance with an embodiment of the present invention. One of the items (shown as item number 2) in the list of search results 700 has been annotated with the expression "*Saved by John Doe." This item refers to microcontent that has been indirectly associated with the user that submitted the search query. More specifically, "John Doe" has been associated with the user submitting the query, microcontent link 520 provides access to microcontent (e.g., microcontent 600 of FIG. 6) that has been associated with John Doe, and contributor link 718 provides access to the online service that is an origin of the trusted source and microcontent associations. In embodiments having the blog identified as the trusted source instead of the blog owner, the expression "*Saved by John Doe" can be replaced with an expression such as "*Mined from John Doe's Weblog."

Figure 8:
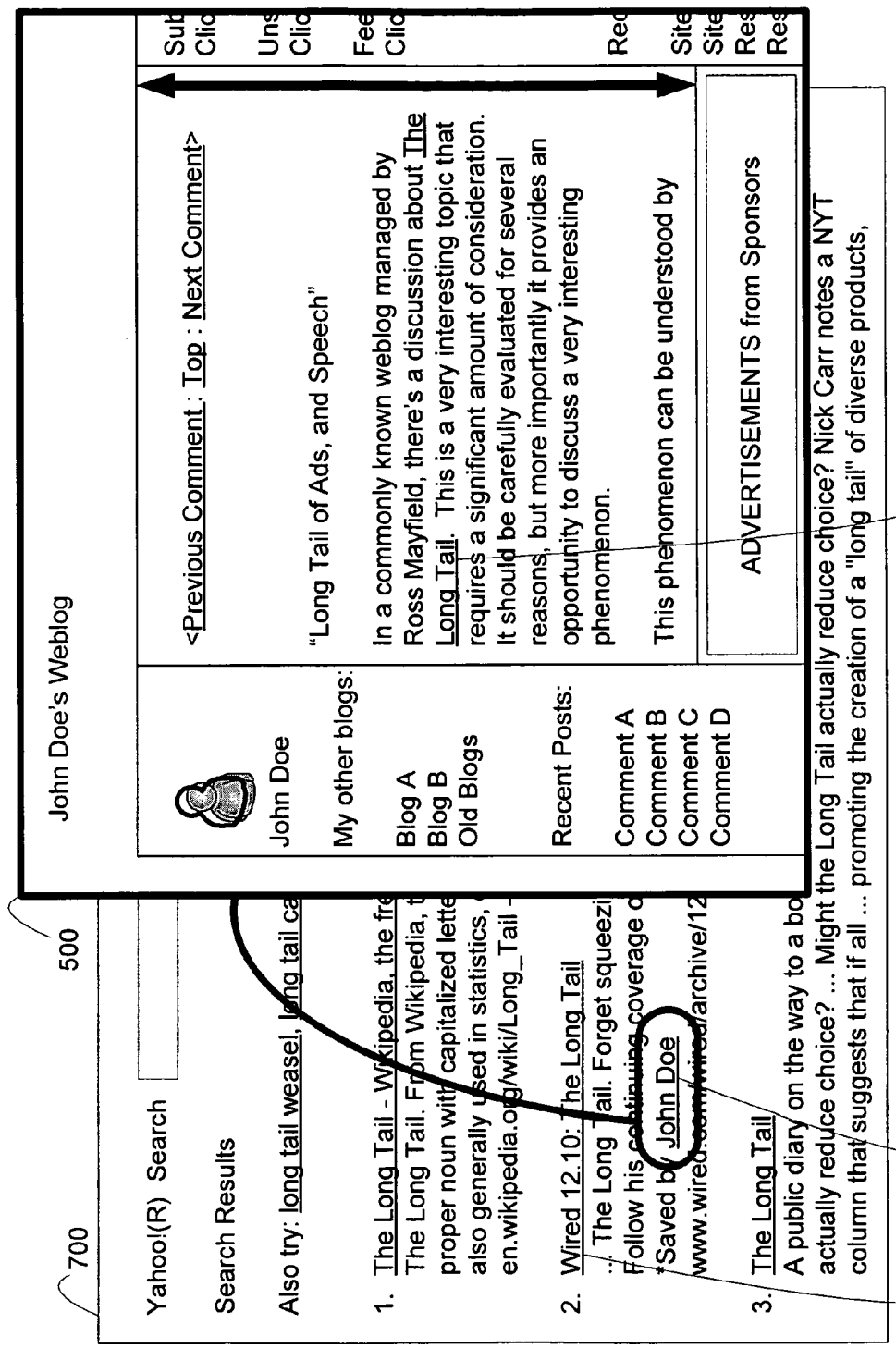
FIG. 8 illustrates navigation to a blog from a page of annotated search results according to an embodiment of the present invention.

This can be explained with reference to FIG. 8, which illustrates an example of a partial frame of blog 500 for which John Doe is the blog owner 518. When a user activates contributor link 718, the user is navigated to blog 500 so that the user can view the blogged entry in blog 500 and consider the context in which the blog owner 518 is using the microcontent. The link for accessing to the microcontent (e.g., microcontent 600 of FIG. 6) is shown by microcontent link 520b in blog 500, and shown by microcontent link 520a in search results 700.

FIG. 9 illustrates a partial page 600 of microcontent that can be retrieved by activating microcontent link 520 in search results 700. By activating microcontent link 520, the user is navigated to the actual microcontent 600.

In the above examples, as described with reference to FIG. 7 through FIG. 9, the search results 700 from a user query have been described to include one or more references (e.g., microcontent link 520) to microcontent (e.g., microcontent 600) that has been referenced in a blog (e.g., blog 500). The blog has been associated with the user, and identified as a trusted source and/or operated by a trusted source of the user's personalized trusted social network. As described above, trusted sources are not restricted to blogs, but can include other online services, such as electronic bulletin boards, emails distributed via a mailing list server, members-only web sites, news sites, alert services, coupon sites, or the like, as well as the owners, operators, contributors, or participants for such online services.

For example, in response to a user query for local restaurants, the search results can include a link to a homepage (e.g., URL) for a restaurant listed in the search results. If the user has subscribed to news website, and the news website has been designated as a trusted source, the search result can include a link (e.g., microcontent link) to any articles (e.g., microcontent) that have been published on the news website with regards to the restaurant.

In another example, a user can have subscribed to an ATOM feed for a coupon site (such as, slickdeals.net). As a result, the coupon site can be designated as a trusted source within the user's personalized trusted social network. Assume that the coupon site includes a posting for new gadget including a URL to a website for purchasing the gadget. When the user searches for the gadget and receives a hit list that includes the website for purchasing the gadget, the hit list can be annotated to indicate the gadget has been posted on the coupon site (e.g., a trusted source) and include a microcontent link to the coupon site. The user could activate the microcontent link to review any discussions on the discount, and/or acquire a coupon for the gadget.

FIGS. 1 through 9 are conceptual illustrations allowing an explanation of the present invention. It should be understood that various aspects of the embodiments of the present invention could be implemented in hardware, firmware, software, or a combination thereof. In such an embodiment, the various components and/or steps would be implemented in hardware, firmware, and/or software to perform the functions of the present invention. That is, the same piece of hardware, firmware, or module of software could perform one or more of the illustrated blocks (e.g., components or steps). Unless explicitly stated otherwise herein, the ordering or arrangement of the steps and/or components should not be limited to the descriptions and/or illustrations hereof.

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like. Notably, the figures and examples above are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). Moreover, it is not intended for any term in the specification or claims to be ascribed an uncommon or special meaning unless explicitly set forth as such. Further, the present invention encompasses present and future known equivalents to the known components referred to herein by way of illustration. While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

I claim:

1. A method implemented on a machine having at least one processor, storage, and a communication platform connected to a network for establishing or maintaining a personalized trusted social network for a user, the method comprising:
 identifying a plurality of online services, wherein the plurality of online services comprise a first online service of which a given user is a subscriber and a second online service of which the given user is not a subscriber;
 identifying one or more trusted sources for the given user and microcontent associated with the plurality of online services by the one or more trusted sources;
 creating a trusted social network based on the identified one or more trusted sources;
 receiving a search query from the given user;
 retrieving a search report in response to the search query;
 discovering the microcontent in the search report; and
 annotating the microcontent in the search report with
  one or more links to the plurality of online services,
  an indication of the one or more trusted sources from the trusted social network, wherein at least one of the one or more trusted sources is related to the second online service of which the given user is not a subscriber, and one or more expressions each of which describes an origin of a corresponding trusted source in the one or more trusted sources, wherein each of the one or more expressions is determined based on a type of the corresponding trusted source.

2. The method of claim 1 wherein the trusted social network is created in a user profile automatically without input from the given user.

3. The method of claim 1 wherein the plurality of online services include at least one of: blogs, electronic bulletin boards, email distribution via a mailing list server, membership web sites, news sites, alert services, and coupon sites.

4. The method of claim 1, further comprising detecting an owner of the plurality of online services to identify the one or more trusted sources.

5. The method of claim 1, further comprising detecting an individual having contributed to the plurality of online services to identify the one or more trusted sources.

6. The method of claim 1 wherein the microcontent includes links to at least one of documentation, articles, forms, multimedia, and images.

7. The method of claim 1, further comprising parsing a subscription feed to identify the one or more trusted sources.

8. The method of claim 1, wherein the given user is a new subscriber of the first online service.

9. A system for establishing or maintaining a personalized trusted social network for a user, the system comprising:
   a tangible non-transitory machine readable medium having executable instructions stored therein; and
   a processing device, in response to the executable instructions, operative to: identify a plurality of online services, wherein the plurality of online services comprise a first online service of which a given user is a subscriber and a second online service of which the given user is not a subscriber;
   identify one or more trusted sources for the given user and microcontent associated with the plurality of online services by the one or more trusted sources;
   create a trusted social network based on the identified one or more trusted sources;
   receive a search query from the given user;
   retrieve a search report in response to the search query;
   discover microcontent in the search report; and
   annotate the microcontent in the search report with
      one or more links to the plurality of online services,
      an indication of the one or more trusted sources from the trusted social network, wherein at least one of the one or more trusted sources is related to the second online service of which the given user is not a subscriber, and
      one or more expressions each of which describes an origin of a corresponding trusted source in the one or more trusted sources, wherein each of the one or more expressions is determined based on a type of the corresponding trusted source.

10. The system of claim 9 wherein the trusted social network is created in a user profile automatically without input from the given user.

11. The system of claim 9 wherein the plurality of online services include at least one of: blogs, electronic bulletin boards, emails distribution via a mailing list server, membership web sites, news sites, alert services, and coupon sites.

12. The system of claim 9 the processor is further operative to detect an owner of the plurality of online services to identify the one or more trusted sources.

13. The system of claim 9 the processor is further operative to detect an individual having contributed to the plurality of online services to identify the one or more trusted sources.

14. The system of claim 9 wherein the microcontent includes links to at least one of documentation, articles, forms, multimedia, and images.

15. The system of claim 9 the processor is further operative to parse a subscription feed to identify the one or more trusted sources.

* * * * *